J. L. HARRINGTON.
PEANUT PICKING MACHINE.
APPLICATION FILED NOV. 20, 1911.
1,035,437.
Patented Aug. 13, 1912.
4 SHEETS—SHEET 1.
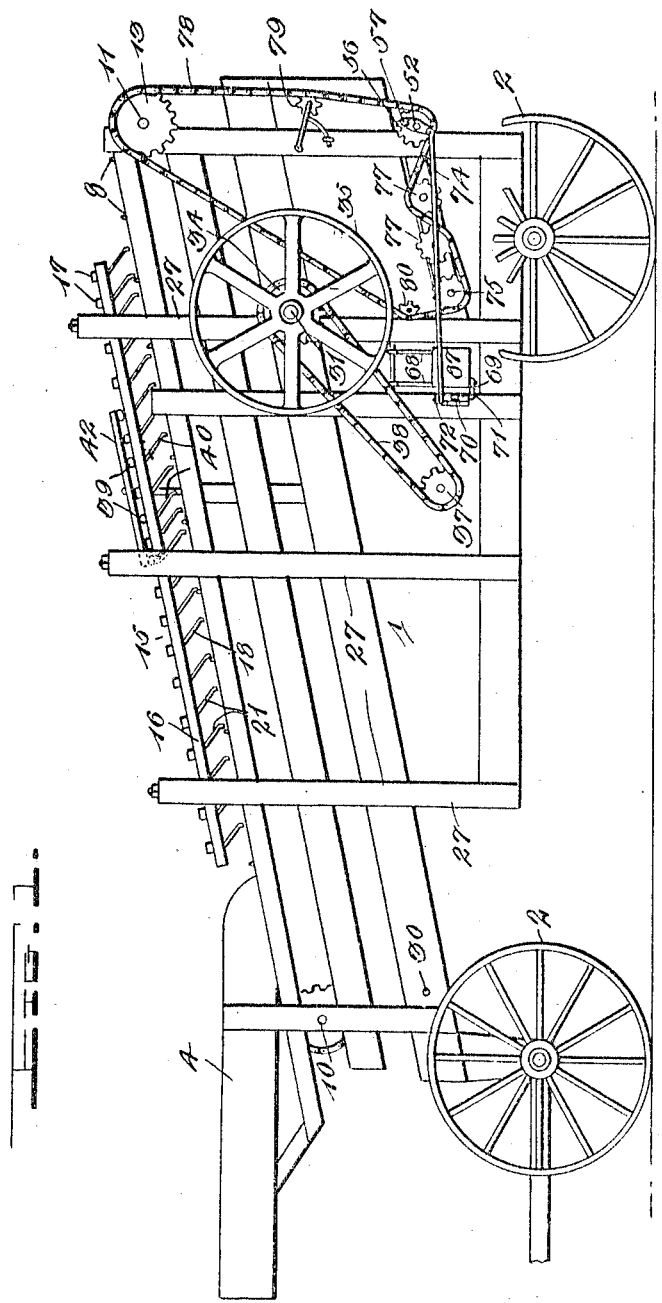
Witnesses
Chas. L. Griesbauer
L. G. Ellis
Inventor
J. L. Harrington,
By Watson E. Coleman
Attorney J. L. HARRINGTON.
PEANUT PICKING MACHINE.
APPLICATION FILED NOV. 20, 1911.
1,035,437.
Patented Aug. 13, 1912.
4 SHEETS—SHEET 2.
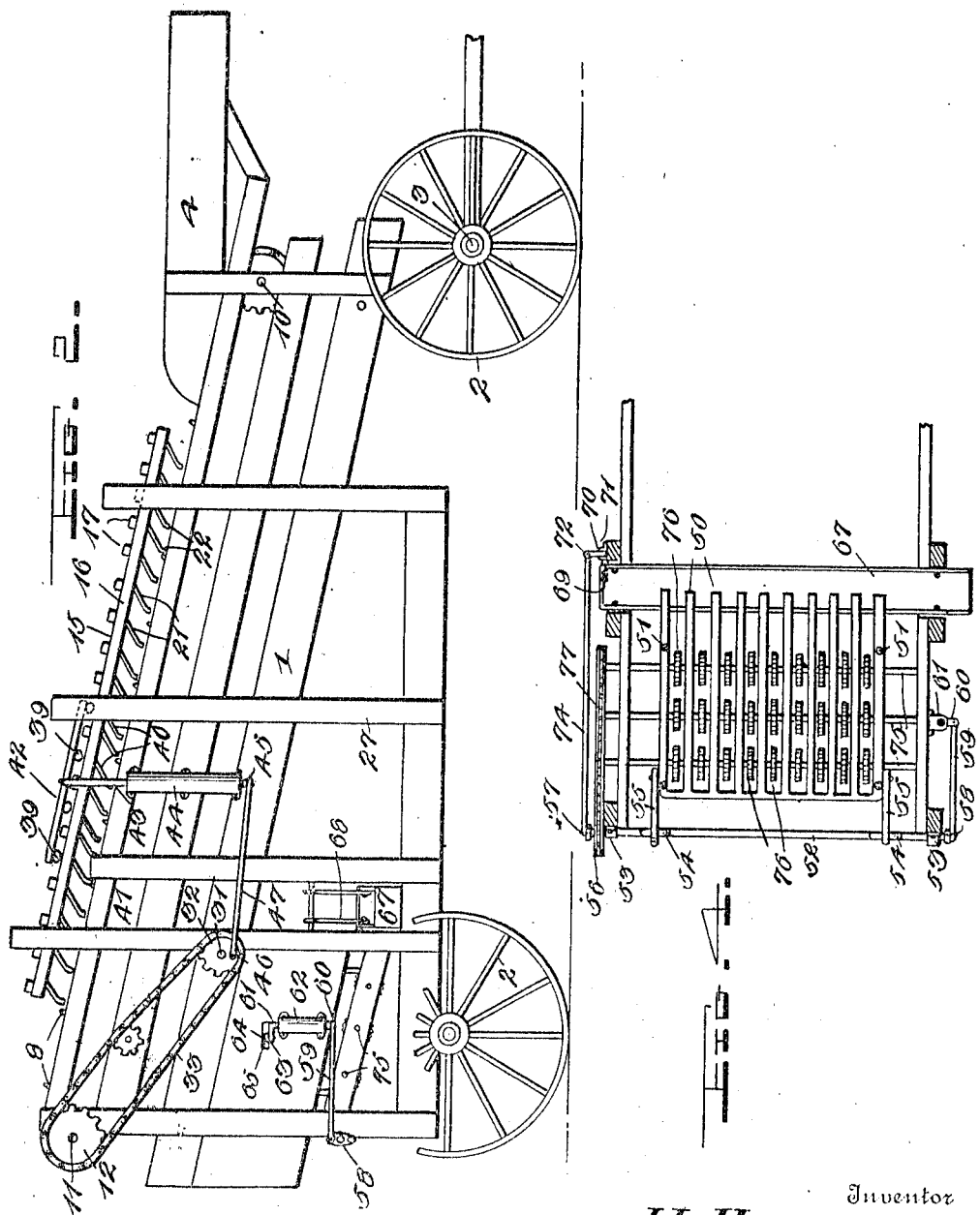
Witnesses
Inventor
J. L. Harrington,
By Watson E. Coleman
Attorney

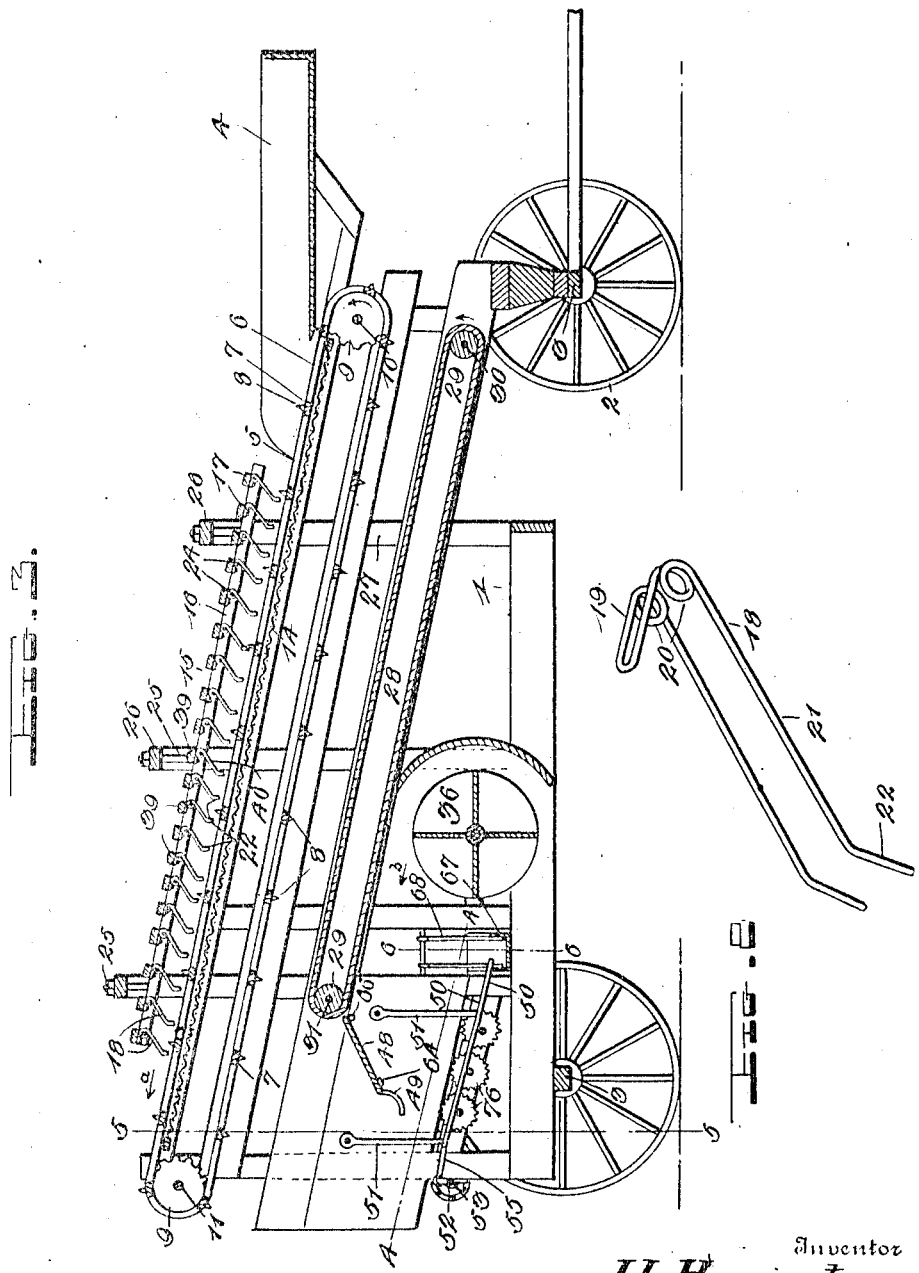

J. L. HARRINGTON.
PEANUT PICKING MACHINE.
APPLICATION FILED NOV. 20, 1911.
1,035,437.
Patented Aug. 13, 1912.
4 SHEETS—SHEET 4.
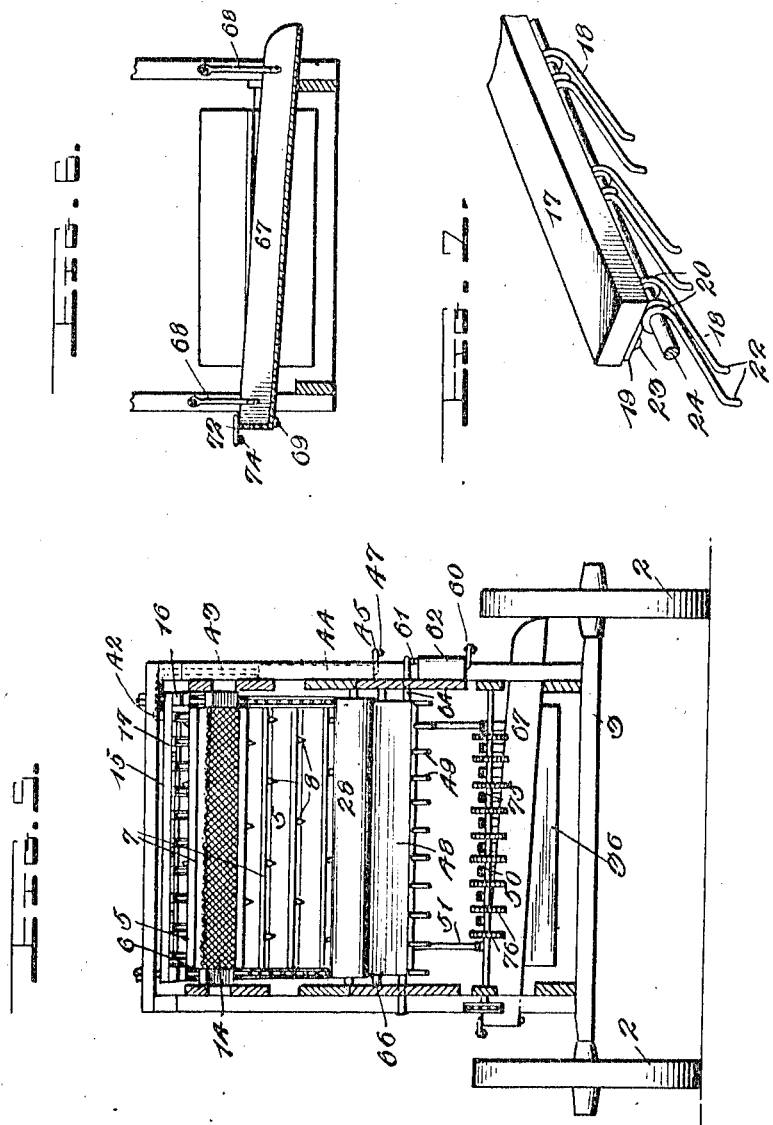
Witnesses
Chas. L. Griestauer.
L. S. Ellis.
Inventor
J. L. Harrington,
By Watson E. Coleman.
Attorney

UNITED STATES PATENT OFFICE.

JOHN L. HARRINGTON, OF LEWISTON, NORTH CAROLINA.

PEANUT-PICKING MACHINE.

1,035,437.   Specification of Letters Patent.   Patented Aug. 13, 1912.

Application filed November 20, 1911. Serial No. 661,361.

*To all whom it may concern:*

Be it known that I, JOHN L. HARRINGTON, a citizen of the United States, residing at Lewiston, in the county of Bertie and State of North Carolina, have invented certain new and useful Improvements in Peanut-Picking Machines, of which the following is a specification, reference being had to the accompanying drawings.

This invention is an improved peanut picking machine for separating peanuts from the vines and roots after they have been dug, the invention consisting in the construction, combination and arrangement of devices hereinafter described and claimed.

In the accompanying drawings: Figure 1 is a side elevation of a peanut picking machine constructed in accordance with my invention; Fig. 2 is a similar view, showing the reverse side thereof; Fig. 3 is a vertical, longitudinal, central sectional view of the same; Fig. 4 is a substantially horizontal sectional view of the same on the plane indicated by the line 4—4 of Fig. 3; Fig. 5 is a vertical transverse sectional view of the same on the plane indicated by the line 5—5 of Fig. 3; Fig. 6 is a detail, vertical sectional view on the plane indicated by the line 6—6 of Fig. 3; Fig. 7 is a detail perspective view of one of the picker bars and showing some of the picker teeth secured thereto; and Fig. 8 is a detail perspective view of one of the teeth.

The frame 1 of the machine may be of the form here shown or of any other suitable construction and is preferably provided with wheels 2 and axles 3 to enable the machine to be drawn from one place to another.

At the front end of the machine, at its upper side, is a feed trough 4. This trough discharges on the front portion of the upper lead of an endless carrier 5 which comprises a pair of endless sprocket chains 6 connected together by transverse flight bars 7 which are provided with outwardly projecting spurs 8. The chains of the endless carrier engage sprocket wheels 9 on a pair of shafts 10, 11. The shaft 11 is also provided, at its ends, on the outer sides of the frame 1, with sprocket wheels 12, 13. It will be observed upon reference to Figs. 1, 2 and 3 of the drawings that the leads of the conveyer 5 are inclined. Under the inclined upper lead of the conveyer is an inclined screen 14, which is fixed, and over the upper surface of which the flight bars of the conveyer pass rearwardly as indicated by the arrow *a*, in Fig. 3.

A picker frame 15 comprises a pair of longitudinal, inclined side bars 16 and a series of cross bars 17 which connect and are secured on the upper sides of said bars 16. The bars 17 are provided with picker teeth 18 which extend rearwardly and downwardly therefrom and the lower ends of which are disposed slightly above the screen 14 so that the flight bars of the carrier 5 move past the lower ends of the picker teeth. These picker teeth are yieldable so that they can turn angularly to permit the flight bars of the carrier to pass under them. They are here shown as made in pairs from substantially U-shaped spring rods bent to form a slotted connecting arm 19, spring coils 20, shanks 21, and downwardly, angularly turned points 22. The arms 19 of the picker teeth are secured to the under sides of the bars 17 by means of bolts 23 and rods 24, which are disposed under the bars 17, pass through the spring coils 20 of the picker teeth and prevent the latter from turning on the bolts 23 and getting out of alinement. The frame 15 is suspended by bolts 25 from cross bars 26 which connect the upper ends of pairs of stanchions 27 on opposite sides of the frame 1.

An endless draper 28, which is also inclined, is disposed below the screen 14. This draper is shorter than the screen and the rear portion of the latter projects rearwardly beyond the draper as shown in Fig. 3. The draper engages rollers 29 on an axle shaft 30 and a driving shaft 31. The said driving shaft is provided at one end with a sprocket wheel 32, which is connected by an endless sprocket chain 33 to the sprocket wheel 12 of the shaft 11 of the endless carrier 5 and, hence, said endless carrier is driven, as well as the draper, by the driving shaft, as will be understood. The upper lead of the endless draper, which is inclined, also moves rearwardly in the machine.

The driving shaft 31 is further provided, at the end opposite that which is provided with the sprocket wheel 32, with a sprocket wheel 34 and a driving pulley 35. The latter is, in practice, engaged by a suitable power belt. A rotary blower 36, which is located below the rear portion of the draper, has its shaft provided at one end with a sprocket wheel 37 which is driven by an endless sprocket chain 38 from the wheel 34.

It will be understood that the blower discharges a blast of air rearwardly under the rear portion of the draper and out through the rear end of the machine, as indicated by the arrow b in Fig. 3.

The picker 15 includes reciprocating elements. In addition to the fixed cross bars 17 it is provided with reciprocating cross bars 39 at a suitable distance from its rear end, and which are disposed alternately with some of the fixed bars and arranged in pairs. These movable bars 39 are likewise provided with picker teeth 40 which are identical in construction with the picker teeth 18 hereinbefore described and the said movable bars are pivotally connected to rocking bars 42, one of which is secured to the upper end of a vertically disposed rock shaft 43. Said rock shaft is mounted in a bearing 44 on one side of the machine frame and has at its lower end a crank arm 45, which is connected to a crank pin 46 on the sprocket wheel 32 by means of a pitman rod 47. Hence when the machine is in operation the rock shaft 43 is actuated and causes the arms 39 of the picker frame to be reciprocated in the direction of their own length and transversely of the picker frame so that the teeth 40 of the said reciprocating bars 39 are also caused to reciprocate.

In the rear portion of the machine is a downwardly and rearwardly inclined chute 48 which is disposed at the rear of the draper and on which the latter discharges, the said chute being also disposed under the rear portion of the screen 14. This chute is provided at its lower rear side with downwardly and rearwardly curved fingers 49. Below the said chute is a downwardly and forwardly inclined vibrating feed grate 50 which is suspended and supported by hangers 51. At the rear end of the machine frame is a shaft 52 which is mounted in bearings 53 and is provided, at points intermediate its ends, with cranks 54 which are connected, by means of rods 55 to the grate, whereby to reciprocate the said feed grate when the shaft is revolved. Said crank shaft is provided at one end with a sprocket wheel 56 and also with a crank 57. Said shaft has a crank 58 at the opposite end. The crank 58 is connected by a rod 59 to the lower crank arm 60 of a rock shaft 61 and the rock shaft is mounted in a bearing 62, and is provided at its upper end with a crank arm 63 which is connected to a bar 64 that extends through a slot 65 in one side of the machine frame and projects from the chute 48. The said chute is mounted to slide or reciprocate transversely of the machine frame, its supports being indicated at 66 and it will be understood that reciprocating motion is communicated to the said chute by the rock shaft 61 and the connections hereinbefore described.

Under the lower front side, which is the discharge side, of the feed grate 50 is a vibrating trough 67 which extends transversely across the machine frame, is supported by hangers 68 and is connected to the lower arm 69 of a vertically mounted rock shaft 70 which is supported in a bearing 71 on one side of the machine frame. Said rock shaft also has an upper arm 72 which is connected by a pitman rod 74 to the crank arm 57 of the shaft 52 and hence the trough 57 is vibrated.

A series of shafts 75 which are disposed in an inclined plane just below the feed grate 50 and mounted in bearings in the sides of the machine frame, are provided with saws 76 which are disposed in the spaces between the bars of the grate 50. These shafts are each provided at one end with a sprocket wheel 77 and the said sprocket wheels are engaged by an endless sprocket chain 78 which is driven by the sprocket wheel 13 of the shaft 11 and also engages the sprocket wheel 56 of the shaft 52 so that the shaft 52 which operates the grate and the trough 67 and the shafts 75 which carry the saws 76, are all revolved when the machine is in operation. The chain 78 is also engaged by a tightener sprocket wheel 79 and an idler sprocket wheel 80.

The operation of my invention is as follows: The peanuts, vines and all, as dug from the ground, are thrown into the trough or hopper 4 and fed therefrom to the carrier 5. As the carrier moves upwardly and rearwardly, over the screen 14 and under the picker teeth 18, the latter operate to pull or pick the peanuts from the vines or haulm and most of the peanuts thus picked from the vines drop directly through the meshes of the screen 14 on to the upper lead of the draper 28. As the material passes under the reciprocating bars 39 of the picker frame the reciprocating picker teeth 41 act in conjunction with the fixed picker teeth 18 to thoroughly shake the vines and dislodge the remaining peanuts therefrom. Such peanuts as do not drop directly on the draper drop from the rear portion of the screen 14 on to the reciprocating chute 48. The haulm is discharged by the carrier 5 at the rear end of the machine and falls clear thereof. The peanuts which fall directly on the chute 48 from the rear portion of the screen 14 and also those which are discharged on said chute by the draper 28, drop from the draper on to the rear, elevated portion of the grate 50. The reciprocating motion of the said grate, together with its inclined arrangement, causes the peanuts, with their adhering rootlets, to pass downwardly and forwardly on the inclined grate and the peanuts are subjected to the action of the saws 76, which coact with the bars of the grate to detach the rootlets from the nuts and to clean them and the cleaned nuts are discharged from the grate into the trough 67, the latter discharging the nuts into a suitable receptacle at one side of the machine frame. The air blast from the rotary blower 36 passes downwardly and rearwardly under the chute so that the peanuts, as they drop from the chute on to the inclined reciprocating grate 50, are subjected to the action of the air blast and cleaned thereby, the air blast carrying off the light particles of trash, as will be understood.

Having thus described my invention I claim:

1. A machine of the class described having a frame, a screen and a carrier movable longitudinally on the screen, in combination with a picker frame disposed above the screen and having cross bars and picker teeth arranged in pairs, each pair comprising a substantially U-shaped spring rod, bent to form a slotted connecting arm, spring coils and shanks extending from the spring coils and connected to the slotted arm thereby, the said slotted arms of the pairs of picker teeth bearing against the said cross bars, and bolts securing the said slotted arms to the cross bars.

2. A machine of the class described having a frame, a screen and a carrier movable longitudinally on the screen, in combination with a picker frame disposed above the screen and having cross bars and picker teeth arranged in pairs, each pair comprising a substantially U-shaped spring rod, bent to form a slotted connecting arm, spring coils, and shanks extending from the spring coils and connected to the slotted arm thereby, the said slotted arms of the pairs of picker teeth bearing against the said cross bars, bolts securing said slotted arms to the cross bars, and rods arranged transversely of the picker frame and extending through the coils of the picker teeth.

3. A machine of the character described, including picking mechanism, and stemming mechanism, the stemming mechanism including an inclined grate and revoluble saws mounted between the bars of the grate, means for operating said saws, and means for longitudinally reciprocating said grate.

4. A machine of the character described, including picking mechanism, stemming mechanism underneath the picking mechanism, means for carrying the nuts from the picking mechanism to the stemming mechanism, the stemming mechanism including a longitudinally reciprocating grate, revoluble saws mounted between the bars of the grate, means for reciprocating the grate, means for rotating the saws, a transverse chute at the discharge end of the grate, and means for imparting a transversely reciprocating movement to said chute.

5. In a machine of the character described, stemming mechanism including a longitudinally reciprocating inclined grate, revoluble saws mounted between the bars of the grate, a transversely extending discharge chute at the lower end of the grate, and means for simultaneously longitudinally reciprocating the grate, revolving the saws, and transversely reciprocating the chute.

In testimony whereof I hereunto affix my signature in the presence of two witnesses.

JOHN L. HARRINGTON.

Witnesses:
J. J. BEELE,
L. S. WEBB.